Jan. 2, 1951     M. SUTER ET AL     2,536,668
ELECTRIC PERMANENT WAVE DEVICE

Filed Sept. 6, 1947     8 Sheets-Sheet 1

INVENTORS
M. SUTER
C. CHEDISTER
BY Morgan, Finnegan
& Durham

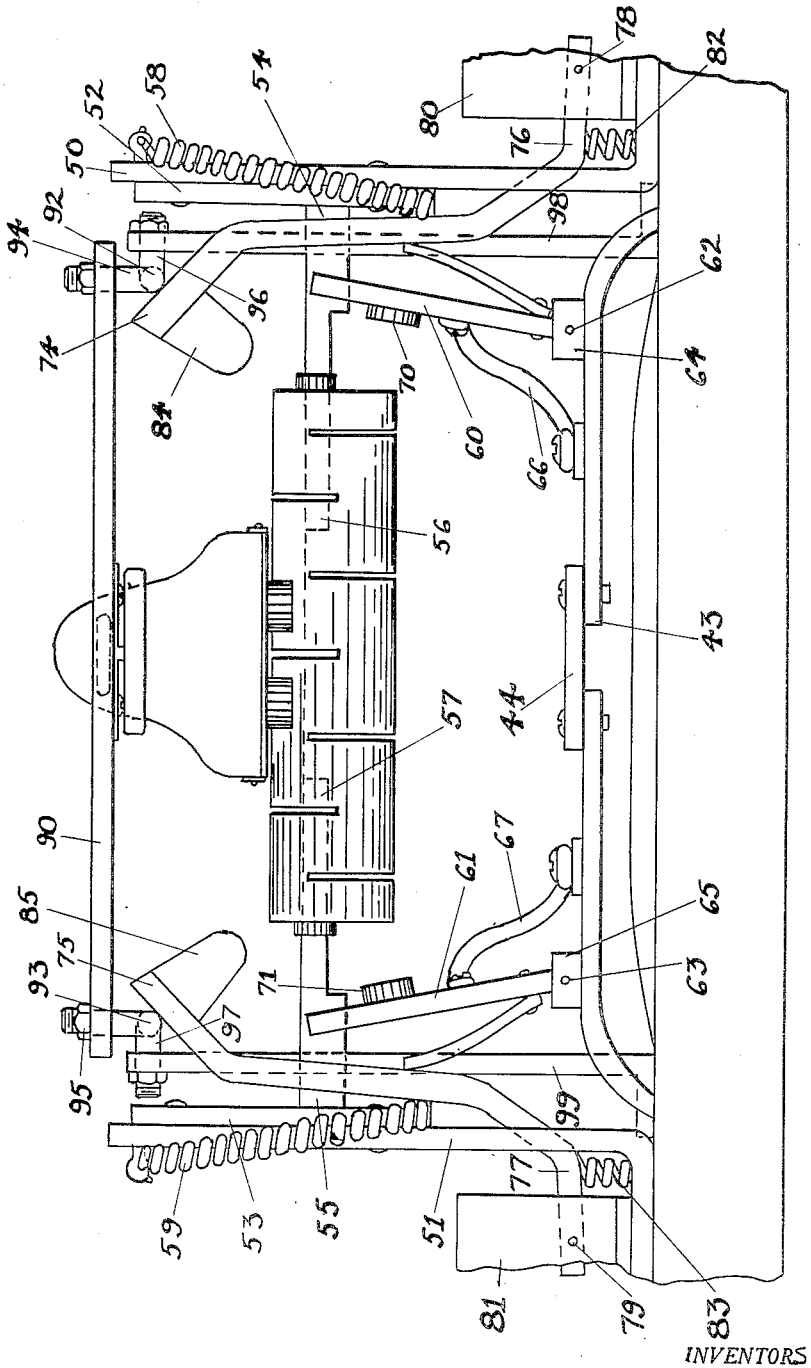

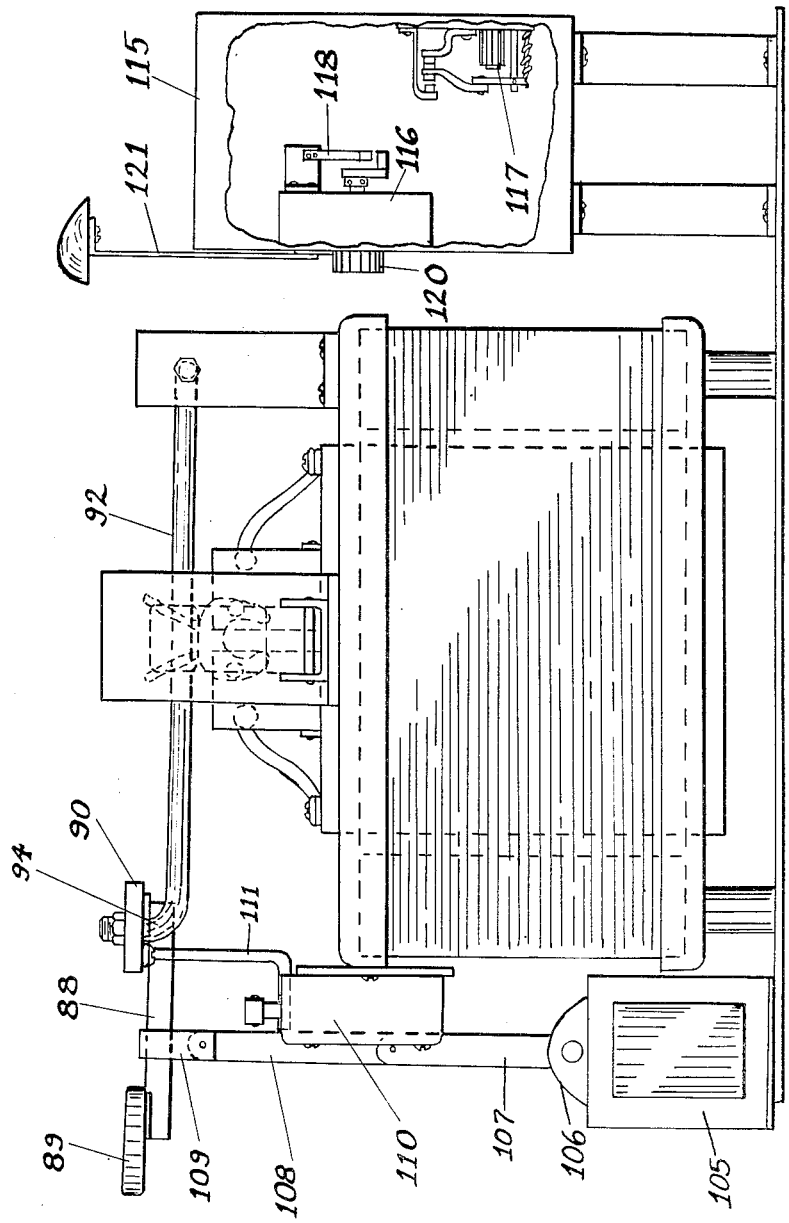

Jan. 2, 1951 M. SUTER ET AL 2,536,668
ELECTRIC PERMANENT WAVE DEVICE
Filed Sept. 6, 1947 8 Sheets-Sheet 4
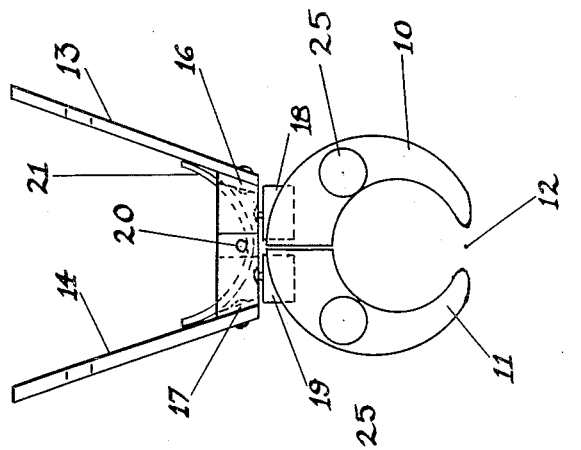
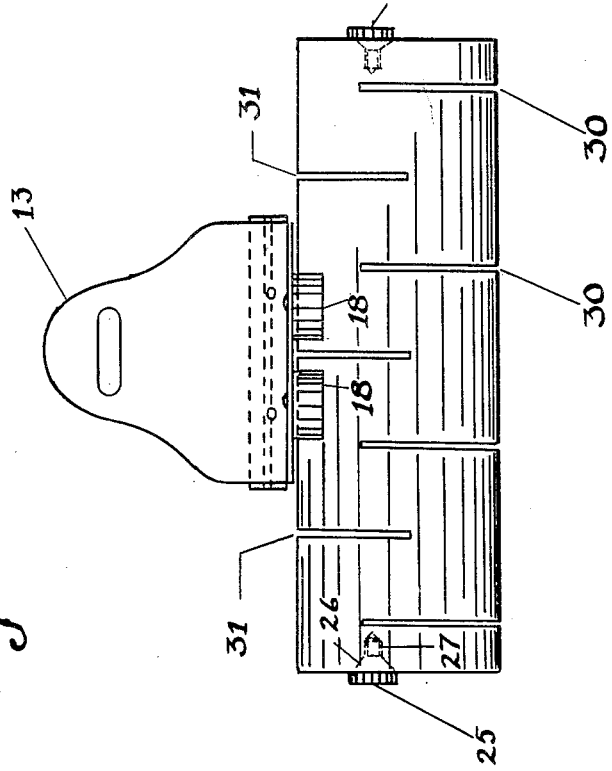
INVENTORS
M. SUTER
C. CHEDISTER
BY
Morgan, Finnegan & Durham

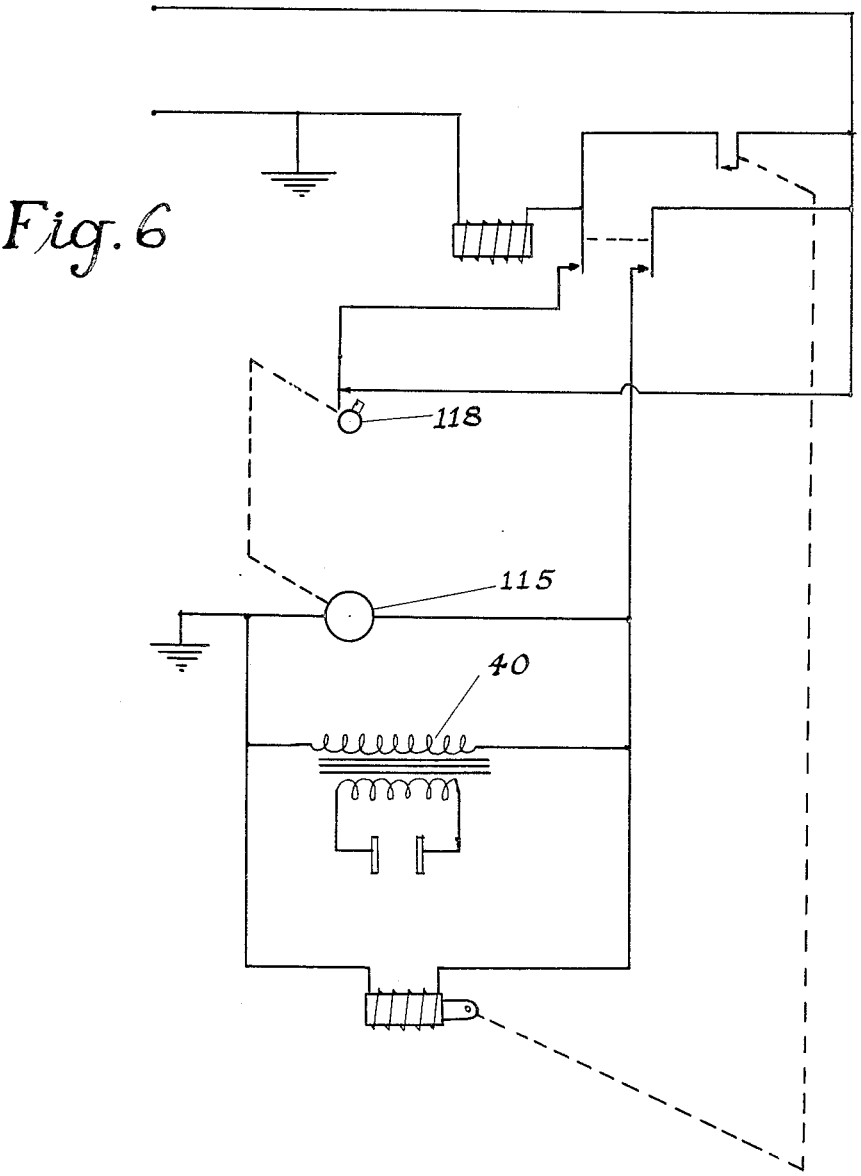

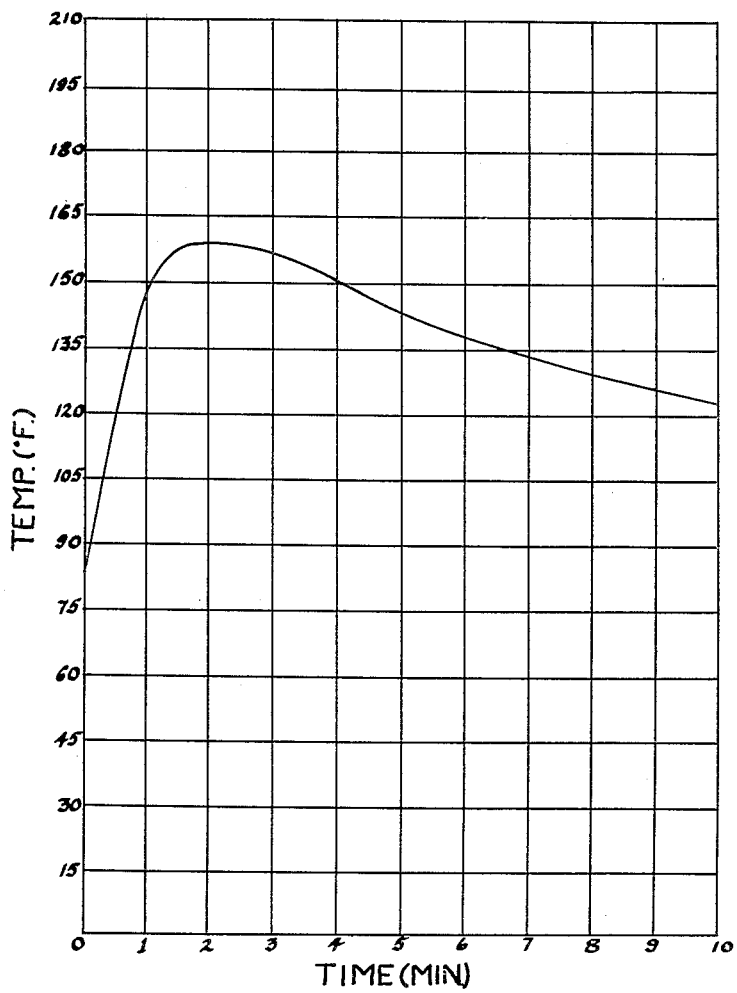

LEGEND-POWER APPLIED TO STEAMER FOR 4 SECONDS.

Jan. 2, 1951    M. SUTER ET AL    2,536,668
ELECTRIC PERMANENT WAVE DEVICE
Filed Sept. 6, 1947    8 Sheets-Sheet 8

LEGEND – POWER APPLIED TO STEAMER FOR 6 SECONDS.

INVENTORS
M. SUTER
C. CHEDISTER
BY
Morgan, Finnegan & Durham

Patented Jan. 2, 1951

2,536,668

UNITED STATES PATENT OFFICE 2,536,668

ELECTRIC PERMANENT WAVE DEVICE

Marcel Suter, Tuckahoe, N. Y., and Conkling Chedister, Livingston, N. J., assignors, by mesne assignments, to The Heckman Company, St. Louis, Mo., a corporation of Missouri Application September 6, 1947, Serial No. 772,576

3 Claims. (Cl. 219—24)

The invention relates to permanent waving and more particularly to improved methods and means for creating and controlling the heat applied to hair in the process of permanently waving same.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is an enlarged fragmentary view similar to Fig. 1 showing said mechanism as the steamer is being inserted;

Fig. 3 is a side elevation of the mechanism of Fig. 1;

Fig. 4 is an enlarged side elevation of a curl steaming unit or steamer;

Fig. 5 is an end elevation thereof; and

Fig. 6 is a circuit diagram of the heating unit.

Figs. 7, 8 and 9 show time-temperature curves on the hair under steamers to which various amounts of heating energy or electric power have been applied.

Figure 1:
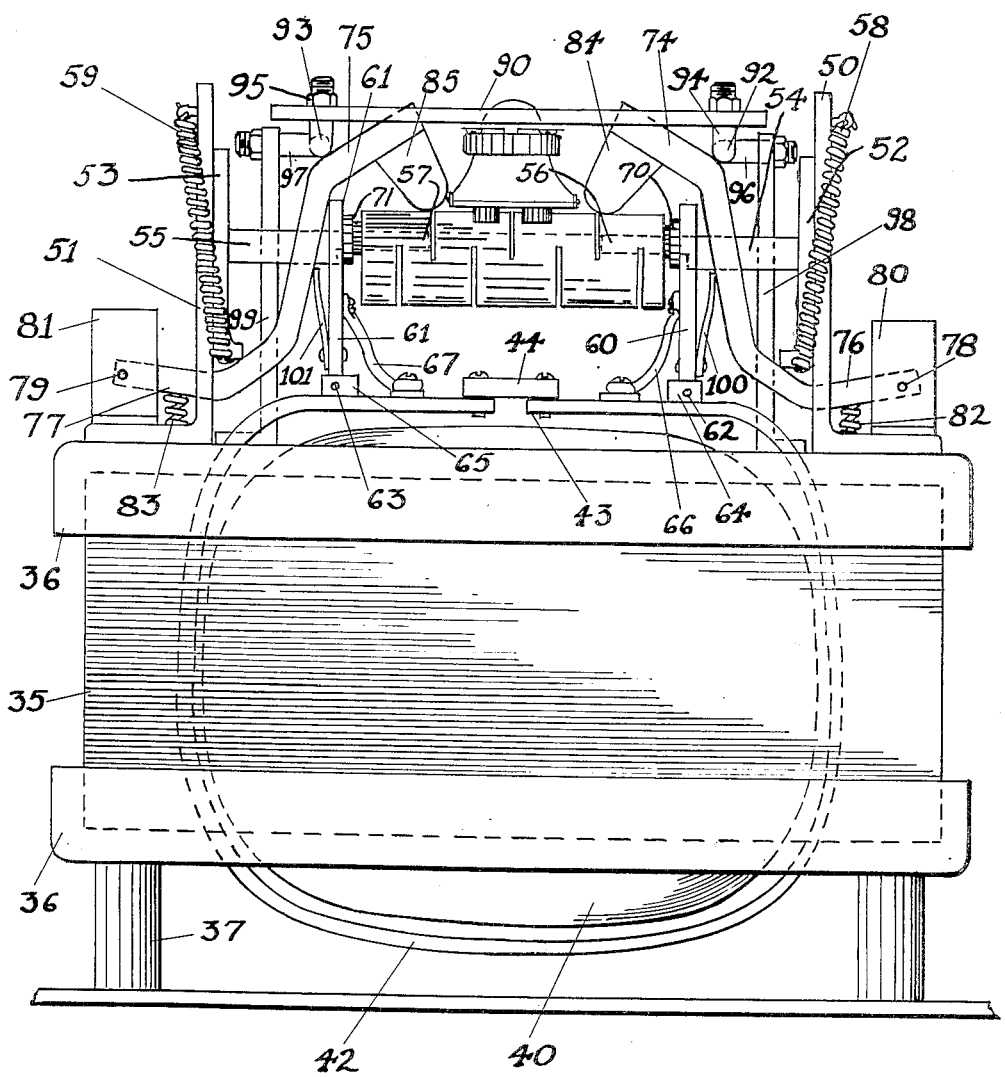
Fig. 1 is an end elevation of a heating mechanism embodying the invention showing the curl steamer in circuit closing position.

The invention utilizes the principle of transferring a predetermined quantity of heat to a mass of high heat capacity and conductivity which, when placed in contact with the hair to be waved transfers said acquired heat to the wound tress in the desired quantity and time. Said mass is preferably a body of metal shaped to fit about a wound and treated tress of hair so as intimately to conform to the external contour of the curled tress and any pads or wrappings thereon so that when so placed about the tress, the heat accumulated in the metal mass, hereinafter called the "steamer," will be supplied to the hair and its wrappings. The mass of the steamer, the heat-receiving and transferring characteristics thereof and the shape and construction thereof are all designed so that heat will be transferred to the curl according to a predetermined optimum time-temperature curve. The optimum temperatures, plotted against time, for producing the optimum waving effect in hair are already known and the invention provides simple and effective means for achieving said time-temperature relation in the tresses of hair being treated in the most efficient, comfortable and effective manner with electrically heated means.

Objects of the invention are to provide novel, simple and useful means and methods for producing the heat required for effecting a permanent wave; for regulating the amount of heat developed and applied to the hair, depending upon the nature of the hair to be waved or curled; and for a novel method of waving the hair by the use of such heating method and means. The invention incorporates all the advantages of electrical heating means for permanent waving; particularly in the exactness of control by timing, in determining the amount and duration of heat supplied to the hair, so that the professional hairdresser can fully exercise his skill and knowledge of hair textures and conditions in giving permanent waves. At the same time, the invention eliminates one of the outstanding disadvantages of known electrical heating apparatus in that no wires or other connections are required from the heat apparatus to the customer's head. Such wire connections have been a source of discomfort and apprehension on the part of women having permanent waves.

The invention also substantially reduces the amount of time required to give permanent waves in that the operation of heat supply to the hair heating device or curl steamer is exceedingly rapid, being generally effected in periods in the order of from 1 to 5 seconds, and the sequence of operations is such that the operator can prepare a tress or curl on the customer's head for heating in just about the time that a steamer is supplied with heat so that these two successive operations can be carried on very rapidly and efficiently by an operator with relatively little training. In spite of the rapidity with which the heat transfer is effected, the mechanism is inherently capable of a very high degree of accurate control and selective variation in the amount of heat given to a particular tress or curl so that extreme accuracy in waving can be obtained.

Another advantage of the invention resides in the safety and comfort provided. Although a steaming temperature is obtained on the hair being treated, the temperature of the heating elements of the steamer is relatively low compared to that normally encountered in electrical heating devices. Also the supply of heat to the steamer is so rapid that it can be handled for some time during the transfer from the heating mechanism to the head without developing a high surface temperature. Because of the construction and inherent functioning of the invention, the weight on the customer's head is slight and the usual discomfort attendant on permanent waving by electrical heat is very greatly reduced.

The invention also is very flexible in the manner and sequence of application to the different parts of the customer's head. Each tress is individually treated and the times of treatment of different tresses can be selected individually and controlled automatically.

In accomplishing the aforesaid objectives and results, we have found that heat can most efficiently and rapidly be supplied to a properly designed steamer by making said steamer a part of the secondary circuit of a step-down transformer. By closing the circuit of the transformer secondary through the metallic mass of the steamer, a very heavy amount of current may be rapidly supplied to said mass and by properly regulating the resistance of the mass, the energy supplied thereto may be acquired as heat which is available to be given off to the curled tress or other object to which the steamer may thereafter be applied. This arrangement not only provides a very rapid and efficient means of heating the steamer, but it also provides means within the selective control of the operator for regulating the quantity of current supplied and thus regulating the amount of heat and the time-temperature performance of the steamer. The invention also provides a very simple and efficient and attractive mechanical apparatus for introducing the steamer into the secondary circuit of the transformer and for automatically delivering or discharging the heat-charged steamer from said apparatus when the predetermined and selected amount of heat has been transferred thereto.

It will be understood that the foregoing general description and the following detailed description as well are examplary and explanatory but are not restrictive of the invention.

Referring now to the present preferred embodiment of the invention illustrated by way of example in the accompanying drawings, the steamer or heat transfer applicator for heating a prepared tress of hair is shown in detail in Figs. 4 and 5. Superficially considered, said steamer is of conventional appearance and resembles a permanent wave heater of the electric resistance or "pre-heat" types for croquignole waving. Said steamer, as shown, comprises two arcuate jaw members 10 and 11 which together form a substantially crescent-shaped cross-section having a cylindrical exterior and, in their closed position providing a bottom gap 12. In said closed position the jaws 10 and 11 of the steamer are adapted to surround and rather tightly embrace a wound croquignole tress of hair having thereon the conventional steaming pad of lotion-absorbent and external shielding foil or other moisture and vapor-impervious wrapping. The positional relation of such pad with respect to the curled tress forms no essential part of the invention and reference may be had to Figs. 5 and 12 of our copending application Serial No. 690,160, filed August 13, 1946, now abandoned, for example, as illustrative of same. While conventional foil and absorbent steaming pads may be used, we have further found that the radiant-energy absorbent pad having the blackened outer foil surface, disclosed in said application is especially effective with the steamer of the present invention.

The jaws 10 and 11 of the steamer are normally held in the closed position shown in Fig. 5 by spring means, but are designed to be spread apart for application to and removal from the treated curl in conventional manner. For this purpose, as shown, two divergent handles or wings 13 and 14 are provided above the upper surface of the steamer, being connected to the respective jaw segments 10 and 11 by means of suitable top brackets 16 and 17. Heat-insulating ceramic blocks 18 and 19 are fixed to the bottoms of the brackets and seated in suitable recesses formed in the upper central portions of the steamer jaws. The brackets 16 and 17 are connected to rock about central pivot rod 20 and a U-shaped leaf spring 21 is provided to maintain the two wings or handles 13 and 14 normally spread apart thereby to hold the jaws 10 and 11 of the steamer in the closed position, as shown.

As will be clear from the drawings, the two jaws or segments 10 and 11 of the steamer are preferably formed of fairly thick solid metal—aluminum has been found very satisfactory in practice, both as to weight and heat characteristics, although other suitable metals may be used. Aluminum is particularly good because it has a high specific heat and therefore a high heat capacity for a given mass; its weight is low; and its heat conductivity is high so that it rapidly transmits its acquired heat to the tress. The aluminum form as shown in Figs. 4 and 5 is substantially full scale.

It is desirable to provide other metal than aluminum for making the electrical contacts whereby the aluminum body of the steamer is placed in the secondary circuit of the transformer. For this purpose we have found that metallic silver provides the best contact surface and as shown, contact studs 25 are mounted at either end of each of the jaws of the steamer. These studs are seated in tapered recesses 26 formed in the solid metal at the ends of the jaws and held therein by screws 27 formed at the small end of the studs. To avoid loss of contact due to oxidation of aluminum surfaces we have also found it desirable to silver-plate the tapered recesses 26.

In providing for the desired predetermined heating action from the metal mass of the steamer, it is necessary that same have an electrical resistance to the flow of current lengthwise through the jaw members 10 and 11, such that the proper and predetermined quantity of heating current is absorbed, in the shortest possible time, by the metal thereof when the steamer is placed in the secondary circuit of the transformer. We have found that the desired resistance characteristics may be created in the steamer, without substantially affecting its structural and heat transfer characteristics, by providing a relatively long and narrow current path through the metal body of the steamer. This can be conveniently effected without changing the structural shape and efficiency of the steamer, by means of spaced slots 30 and 31 cut transversely into the metal jaws of the steamer. The slots 30 are started at the bottoms of the jaws and preferably continue beyond the central portion thereof, while the slots 31 start at the top and are cut down somewhat below the center. Accordingly as will be clear from Fig. 4, the current flow lengthwise of the steamer jaws must travel in a sinuous path of considerably greater length and lesser cross-section than the physical outline of the steamer jaws would normally afford. It will be obvious that by varying the number and arrangement of said slots the electrical resistance of the steamer may be varied considerably.

Referring now to the transformer mechanism wherein the steamer of Figs. 4 and 5 is positioned for the heat creating and accumulating operation, the physical construction thereof is shown in Figs. 1, 2 and 3. Generally considered, this mechanism comprises several major features, namely, the transformer construction; the devices for placing and holding the steamer in current-receiving position and for discharging same thereafter; and the means for controlling and varying the time during which current is supplied to the closed transformer circuit.

Referring first to the transformer elements, these comprise the conventional laminated core 35 mounted in a suitable casing 36 supported on legs 37. The primary coil 40 of this step-down transformer, calibrated to operate on the usual 120 volt circuit, is constructed in the conventional manner and mounted within the secondary 42, which comprises a wide copper bus disposed as a single turn mounted within the transformer core and housing as shown, the upper and lower portions thereof extending beyond the top and bottom of the housing. Said secondary is designed to deliver a heavy charge of current at a very low voltage, preferably about 1 volt. The coil of the transformer secondary is normally open, the top portion of the bus 42 being broken at 43, and the ends thereof physically joined by an insulating bar 44 of plastic or other di-electric material.

In accordance with the invention, means are provided for inserting and receiving the steamer hereinabove described in such position that it will close the circuit through the secondary coil of the transformer and thereby form a resistance path for current induced in said secondary. As embodied, fixed L-shaped uprights 50 and 51 are mounted on the top frame 36 of the transformer, forming brackets to support slidable bars 52 and 53, respectively, mounted for vertical sliding movement along the inner faces of the uprights. Said bars 52 and 53 have extending from the inner faces thereof transverse horizontal rods 54 and 55, respectively, said rods being provided at their inner ends with reduced horizontal extensions 56 and 57, respectively, for receiving and supporting a steamer which is adapted to be laid thereon as shown in Fig. 2. The rod extensions 56 and 57 are sufficiently narrow to pass through the steamer gap 12 without requiring opening of the jaws 10 and 11. Means are provided for normally holding the bars 56 and 57 in the elevated position shown in Fig. 2 from which position the bars and the steamer supported thereon are adapted to be depressed into the live or heating position shown in Figs. 1 and 3. Said means comprise the coil springs 58 and 59, respectively, fixed at their upper ends to the uprights 50 and 51 and connected at their lower ends to the inturned terminals formed at the bottoms of the bars 52 and 53, respectively.

In the upper or idle position shown in Fig. 2, the steamer is out of electrical contact with the secondary of the transformer and, in accordance with the invention, depression of said steamer to its lowered position automatically closes the circuit of the transformer secondary and causes the high amperage current thereof to pass through the steamer. For this purpose the invention provides manually controllable means for lowering the steamer into the live or energizing position and for automatically bringing the end contact studs 25 thereof into contact with the electrical terminals of the secondary coil. This feature of the invention also provides that the contact between the steamer and the secondary terminals be of a resilient and wiping nature so as to insure the most efficient electrical contact and to keep the contacting surfaces clean and resistance-free at all times.

As embodied the upper horizontal surface of the secondary bus 42 is provided with upright terminal arms 60 and 61 which are pivotally mounted to have a limited rocking movement from the outwardly inclined position shown in Fig. 2 to the vertical contacting position shown in Fig. 1. For this purpose the lower ends of said bars 60 and 61 are provided with horizontal pins 62 and 63, respectively, journalled in upstanding yokes 64 and 65. Current is transmitted from the upper live surfaces of the bus 42 to the metal arms 60 and 61 by means of flexible cables 66 and 67 respectively, the lower ends of said cables being fastened to the upper faces of the bus as by the screw contacts shown and the upper ends thereof are fastened to the inner faces of the bars 60 and 61 in similar manner. The lengths of said cables 66 and 67 are sufficient to permit free rocking movement within the limits shown. Contacting terminal studs or buttons 70 and 71, preferably made of silver or other metal which is a good conductor and relatively free from corrosion or other chemical deposits interfering with conductivity, are formed on the inner upper faces of the bars 60 and 61, respectively.

The embodied means for lowering the steamer on its supporting rods 56 and 57 into the contacting and heating position and for simultaneously erecting the terminal bars 60 and 61 into said contacting position comprises a pair of steamer-depressing arms 74 and 75. The lower end portions 76 and 77 of said arms are turned horizontally outwardly and are pivotally mounted for lateral swinging movement as by pins 78 and 79 within upright bracket yokes 80 and 81, respectively. The intermediate portions of said arms are generally upright, being normally held in said position (Fig. 2) by coil springs 82 and 83, respectively. The terminal or actuating ends of the arms are provided with downwardly and inwardly inclined fingers 84 and 85, respectively, which in the idle position of Fig. 2 lie above and at the ends of the steamer supported on the rods 56 and 57.

Means are provided for imparting downward and inward rocking movement to the arms 74 and 75 so as to cause the fingers 84 and 85 thereof to engage the upper surface of the steamer and force same downwardly into the contacting position. Said means comprises an operating lever or handle 88 having a depressible thumb piece 89 at its outer end and being connected at its inner end to the transverse bar 90 of a pivoted bail which lies above the arms 74 and 75. Said bail comprises two parallel fore-and-aft rods 92 and 93 which are adapted to overlie and engage the upper edges of the depressible arms 74 and 75. The forward ends of said rods 92 and 93 are upturned at 94 and 95, respectively, to engage the transverse bar 90 of the bail, being conveniently connected thereto by threaded nut connections as shown. The rear end portions of said rods 92 and 93 are outturned horizontally at 96 and 97, respectively, and journalled in upright bracket posts 98 and 99, respectively, being fastened thereto by threaded nut connections as shown.

It will be understood that when the thumb piece 89 is depressed by the operator the bail 90, 92, 93 is lowered and the rods 92 and 93 thereof engage the upper edges or shoulders of the arms 74 and 75, respectively, depressing same downwardly and inwardly. As these arms are depressed, the fingers 84 and 85 come in contact with the upper surface of the steamer, force same downwardly into the position shown in Fig. 1. That movement effects a depression of the rods 56 and 57 causing the slides 52 and 53 to be lowered against the stretch of the springs 58 and 59.

By means of the downward and inward movement of said arms 74 and 75, the contact bars 60 and 61 are simultaneously erected into the vertical position. This action is accomplished by means of leaf springs 100 and 101 which are connected adjacent the lower outer surfaces of said bars 60 and 61, respectively. At their free or upper ends, said springs lie against the inner edges of the arms 74 and 75 in continuous slidable contact therewith. Thus as the arms are depressed, said leaf springs cause the bars 60 and 61 to be erected in a resilient manner.

It will be seen that because of the combined motions of the steamer and the contact bars 60 and 61, the contact studs 25 on the steamer and the contact surfaces 70 and 71 on the bars are brought together with a resilient wiping motion. This effects a very efficient electrical contact between the meeting surfaces because of the strong resilient pressure exerted and also because the wiping action tends to clean off and remove any oxidation, corrosion or other foreign material on the silver surfaces and thereby assure the optimum electrical contact conditions.

The invention provides power means for automatically taking over the downward movement of the operating handle 86 and the attached depressing bail and completing the down stroke thereof and also for holding same in the depressed position for a predetermined, selectively variable time period. For this purpose a solenoid comprising a suitably housed and supported coil 105 is provided at the base of the machine adjacent the front thereof and directly below the actuating arm 88. The armature 106 of said solenoid is pivotally connected at its upper end by links 107, 108 and 109 to the arm 88 so that when the arm is manually depressed a certain distance, the energization of the solenoid will cause the arm 88 to be pulled down the remainder of its stroke by the downward movement of the armature and said arm and the bail will remain in the fully depressed position so long as the solenoid remains energized. Energization of the solenoid is automatically effected upon partial depression of the bar 88 by means of contact switch 110. An actuating member 111 for said switch extends upwardly from the switch position to underlie the cross bar 90 of the bail and be moved downwardly by the depression thereof so that the switch is thereby closed. When the solenoid circuit is broken by the timing means as hereinafter described, the bail and operating handle 88 are automatically restored to the idle or elevated position by recoil of the springs 58 and 59 and simultaneously the arms 74 and 75 will swing out under influence of springs 100, 101, 82 and 83. This upward movement of the parts carries with it the steamer which has been charged with heating current during the period of contact and is thus ready to be lifted from its elevated position (Fig. 2) and applied to a tress as previously described.

The embodied means for keeping the solenoid circuit closed for a variable predetermined time period comprises an electrical timing device of known construction including a casing 115, a timing motor 116, a holding relay 117 and a break switch 118. These devices are all of conventional construction and need not be described in detail. The face 120 of the timer is provided with suitable graduations and a sweep hand or the like is mounted thereon for indicating the elapse of time. A suitable control lever 121 is provided for varying the time interval of solenoid energization so that the length of time the steamer is held in the secondary coil circuit of the transformer may be varied. It will be understood that said period of time is in all cases very short, of the order of 1 to 5 seconds, but that variations within that illustrative range of time make substantial differences in the amount of heat imparted to the steamer and therefore in the time-temperature heat transmission curve of the steamer with respect to the hair.

Figure 8:
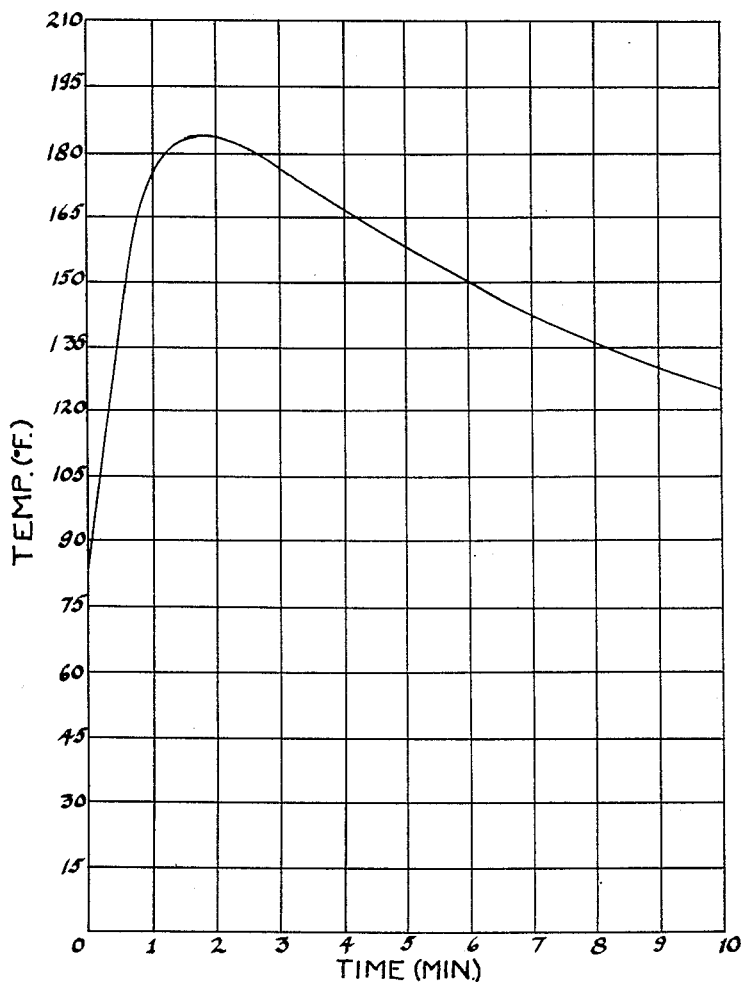
Figure 9:
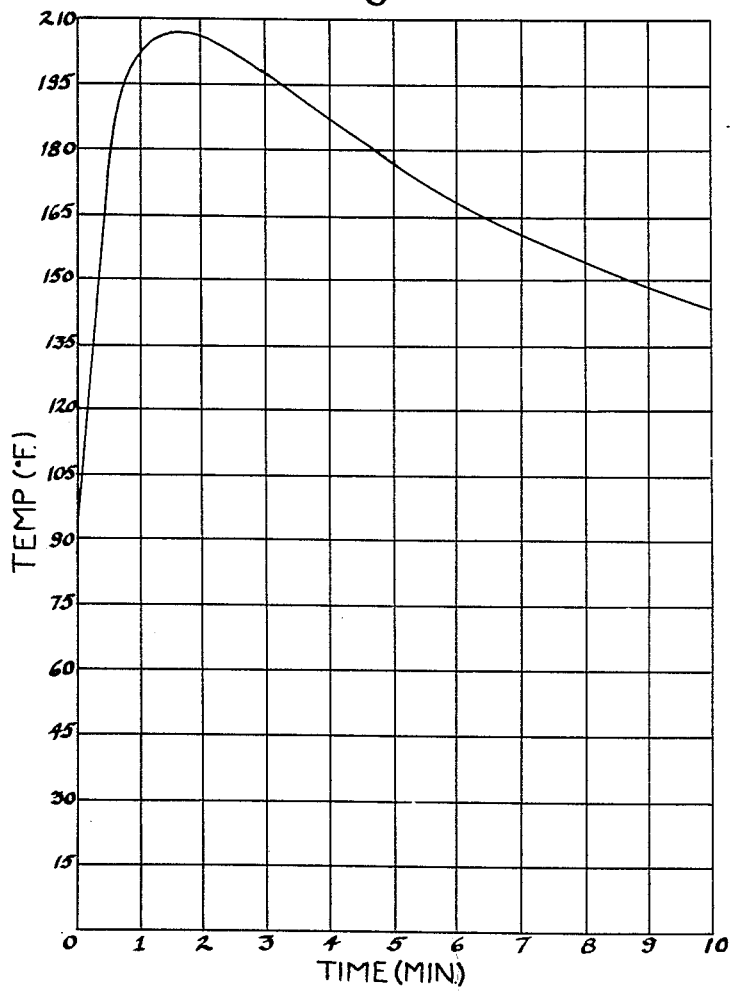

Three illustrative time-temperature curves are shown in Figs. 7, 8 and 9 indicating variations in the heating effect by modifying the time of contact of the steamer in the secondary circuit. These temperatures are those taken at the inside of the curling rod on which the treated tress is wound.

It will be observed that the maximum temperature reached by the hair increases directly with the amount of power or heating energy applied to the steamer in the transformer and in these curves said variations are effected by varying the time that the uniform voltage current is applied. Thus when the steamer is in the power circuit for two seconds the maximum temperature reached by the hair during an application period of 10 minutes is about 160° F. When the same steamer was left in the power circuit for 4 seconds the maximum hair temperature arose to about 185°, while 6 minutes of power application caused the maximum hair temperature to reach about 207°. It will be noted that in all cases the maximum hair temperature is reached in a very short period of time, that is, generally in about 1 and 1½ minutes, regardless of the amount of power applied to the steamer and that after said maximum temperature is reached, the rate of temperature drop is at a fairly uniform rate and moderate slope, in all cases tending to reach uniformity in about 10 to 12 minutes. While the charts indicate leaving the steamer on the hair for a waving period of 10 minutes, this is not a critical time, as the steamer can be left on indefinitely without harm to the hair, or may be removed sooner if an early and more rapid cooling of the hair is desired.

These curves show how accurately and minutely the heating effect on the hair can be regulated, while in all cases the form of the curve corresponds substantially to that which has been found to be best adapted to the permanent waving of hair in previous heating systems, such as those employing exothermic heating pads for example. However, while in the exothermic systems it is impracticable to vary the time-temperature curve with respect to different curls, wide variations can be effected by our invention. At the same time, it is possible with our invention to employ waving solutions of different strengths and waving effects, such as are presently employed with the uniform time-temperature exothermic systems. Hence with our invention it is possible to obtain a far greater degree of control and variety in the temperatures and waving effects.

In Fig. 6 is shown a wiring diagram for the apparatus hereinabove described, the relevant portions thereof being numbered to correspond with the mechanical parts previously described.

While we prefer to regulate the amount of heat supplied to the steamer by varying the time of contact in the secondary circuit, it will be understood that similar effects can be obtained by maintaining the time constant and varying the voltage supplied to the secondary; or by varying both said factors. Also it is possible to have steamers of different resistances, as by varying the number of slots 30 and 31, so that different amounts of heat would be supplied to said different resistance steamers in a transformer of constant voltage during a constant time period. It will be understood that these variations in the manner of effecting selective variability in the total quantity of heat supplied to the steamers are within the purview of our invention and the necessary changes in the apparatus to achieve them will be obvious, in the light of this disclosure, to those skilled in the art.

In operation the hairdresser or operator will normally wind the desired number of curls on the patron's head as the first step. Having wound, say, 25 curls, the operator soaks the required number of absorbent pads in waving solution and the head is then ready for heating. She then sets a steamer into the heating apparatus and depresses lever 88. By the time the steamer is ready and is raised to the elevated position (in say three seconds), the operator will have had time to adjust a moistened pad on the curl and can then lift the heat charged steamer from the heating apparatus and set it on the prepared curl. These operations can be performed deftly and quickly and it will be noted that during the first few seconds of handling the surface of the steamer will not have reached a temperature uncomfortable to the touch should the fingers of the operator or the scalp of the patron inadvertently be brought into contact therewith. Once placed on the curl, the temperature of the interior of the curl rises rapidly as indicated by the curves in Figs. 7, 8 and 9 and the desired steaming effect is accomplished. Once the steamer is so seated about a curl, the operator need give it no further attention, as it can be left on indefinitely after the curve of temperature drops and flattens out, so she can proceed to wrap and heat the other curls in like manner. The whole head can thus be successively worked upon and by virtue of the time setting of the timing device, any desired time-temperature effect on a selected curl can be obtained in accordance with the nature and waving characteristics of the hair being treated and the style of permanent wave desired according to the different parts of the hair on the head.

The invention in its broader aspects is not limited to the specific mechanisms shown and described but departures may be made therefrom within the scope of the accompanying claims without departing from the principles of the invention and without sacrificing its chief advantages.

What we claim is:

1. Heating apparatus for permanent waving including in combination an electrically conductive steamer having such heat capacity to produce the proper time-temperature relation for permanently waving a curl of hair when placed adjacent a curl and a transformer to deliver a relatively heavy current at a low voltage to heat said steamer in a few seconds of time, said steamer being connectible in the circuit of one of the transformer coils to be heated by the current flowing therethrough and timing means, contacts supplied by said transformer and engageable with contacts on said steamer to connect it in circuit, control means for starting said timing means and engaging the contacts with the steamer, a holding relay controlled by the timing means and controlling the supply of power to the transformer, and means for releasing the contacts from the steamer on completion of the timing period, for automatically disconnecting said steamer from said circuit when a predetermined amount of heating energy has been supplied to the steamer.

2. Heating apparatus for permanent waving including in combination an electrically conductive steamer having such heat capacity to produce the proper time-temperature relation for permanently waving a curl of hair when placed adjacent a curl having a predetermined resistance, a transformer to deliver a relatively heavy current at a low voltage to heat said steamer in a few seconds of time having a normally open secondary circuit, contact members on the steamer cooperable with contact members in said circuit mounted on the transformer, the steamer being movable relative to the transformer to connect and disconnect said contacts with each other, timing means, contacts supplied by said transformer and engageable with contacts on said steamer to connect it in circuit, control means for starting said timing means and engaging the contacts with the steamer, a holding relay controlled by the timing means and controlling the supply of power to the transformer, means for releasing the contacts from the steamer on completion of the timing period, and means for moving the steamer away from the transformer on completion of the heating period.

3. Heating apparatus for permanent waving including in combination an electrically conductive steamer having such heat capacity to produce the proper time-temperature relation for permanently waving a curl of hair when placed adjacent a curl and a transformer to deliver a relatively heavy current at a low voltage to heat said steamer in a few seconds of time, said steamer being connectible in the circuit of one of the transformer coils to be heated by the current flowing therethrough through moveable contacts mounted on the transformer and timing means, contacts supplied by said transformer and engageable with contacts on said steamer to connect it in circuit, control means for starting said timing means and engaging the contacts with the steamer, a holding relay controlled by the timing means and controlling the supply of power to the transformer, and means for releasing the contacts from the steamer on completion of the timing period, for automatically disconnecting said steamer from said circuit when a predetermined amount of heating energy has been applied to the steamer.

MARCEL SUTER.
CONKLING CHEDISTER.

REFERENCES CITED

The following references are of record in the file of this patent:

UNITED STATES PATENTS

| Number | Name | Date |
|---|---|---|
| Re. 21,994 | Freudenberg et al. | Jan. 6, 1942 |
| 909,924 | Monnot | Jan. 19, 1909 |
| 1,781,244 | Oswald | Nov. 11, 1930 |
| 1,972,186 | Davis | Sept. 4, 1934 |
| 1,980,475 | Davis | Nov. 13, 1934 |
| 2,108,240 | Thomsen | Feb. 15, 1938 |
| 2,149,153 | Thomsen et al. | Feb. 28, 1939 |
| 2,159,358 | Metz | May 23, 1939 |
| 2,165,552 | Johnson | July 11, 1939 |
| 2,167,831 | Frederics | Aug. 1, 1939 |
| 2,183,023 | Kubiak et al. | Dec. 12, 1939 |
| 2,204,936 | Kriss | June 18, 1940 |
| 2,216,654 | Seubert | Oct. 1, 1940 |
| 2,231,695 | Vedder | Feb. 11, 1941 |
| 2,265,920 | Maize | Dec. 9, 1941 |
| 2,363,645 | Conboy | Nov. 28, 1944 |
| 2,386,168 | Pattberg | Oct. 2, 1945 |

FOREIGN PATENTS

| Number | Country | Date |
|---|---|---|
| 357,608 | Great Britain | Sept. 28, 1931 |